(12) United States Patent
Yoon

(10) Patent No.: US 12,435,765 B2
(45) Date of Patent: Oct. 7, 2025

(54) BRAKE DEVICE AND VEHICLE HAVING THE SAME

(71) Applicant: HYUNDAI MOBIS CO., LTD., Seoul (KR)

(72) Inventor: Bo Ram Yoon, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 420 days.

(21) Appl. No.: 18/077,325

(22) Filed: Dec. 8, 2022

(65) Prior Publication Data

US 2023/0407936 A1 Dec. 21, 2023

(30) Foreign Application Priority Data

May 27, 2022 (KR) .................. 10-2022-0065482
May 31, 2022 (KR) .................. 10-2022-0066640

(51) Int. Cl.
*F16D 65/095* (2006.01)
*F16D 55/226* (2006.01)
*F16D 65/00* (2006.01)
*F16D 65/18* (2006.01)
*F16D 66/00* (2006.01)
(Continued)

(52) U.S. Cl.
CPC ......... *F16D 65/183* (2013.01); *F16D 55/226* (2013.01); *F16D 65/0068* (2013.01); *F16D 65/095* (2013.01); *F16D 66/00* (2013.01); *F16D 2055/0062* (2013.01); *F16D 2066/005* (2013.01); *F16D 2121/14* (2013.01); *F16D 2125/40* (2013.01)

(58) Field of Classification Search
CPC .. F16D 65/182; F16D 65/0068; F16D 65/095; F16D 55/226; F16D 66/00; F16D 2055/0062; F16D 2066/005; F16D 2121/14; F16D 2125/40
USPC ................................... 188/156–164
See application file for complete search history.

(56) References Cited

U.S. PATENT DOCUMENTS 6,098,763 A * 8/2000 Holding ................ B60T 13/741
188/162
10,823,242 B2 * 11/2020 Choi ..................... B60T 13/741
(Continued)

FOREIGN PATENT DOCUMENTS

KR 10-2014-0012451 A 2/2014
KR 10-2019-0069884 A 6/2019

*Primary Examiner* — Christopher P Schwartz
(74) *Attorney, Agent, or Firm* — Novo TechIP International PLLC

(57) ABSTRACT

Disclosed is a brake device, including a motor unit operated by an electrical signal, a gear unit having a plurality of gears connected to the motor unit, a cylinder unit having a piston connected to the gear unit to be propelled by operations of a plurality of the gears, a brake pad unit connected to the piston to be propelled by propulsion of the piston, and a caliper body having the cylinder unit seated thereon to guide the brake pad unit. Disclosed is a vehicle having a brake device, the brake device including a motor unit operated by an electrical signal, a gear unit having a plurality of gears connected to the motor unit, a cylinder unit having a piston connected to the gear unit to be propelled by operations of a plurality of the gears, a brake pad unit connected to the piston to be propelled by propulsion of the piston, and a caliper body having the cylinder unit seated thereon to guide the brake pad unit.

11 Claims, 14 Drawing Sheets

(51) Int. Cl.
  *F16D 55/00*    (2006.01)
  *F16D 121/14*   (2012.01)
  *F16D 125/40*   (2012.01)

(56) References Cited

U.S. PATENT DOCUMENTS

2019/0063519 A1*  2/2019  Al-Mahshi .......... F16D 55/2262
2024/0344576 A1* 10/2024  Yoon ................... F16D 65/183

* cited by examiner

BRAKE DEVICE AND VEHICLE HAVING THE SAME

CROSS-REFERENCE TO RELATED APPLICATIONS

Pursuant to 35 U.S.C. § 119(a), this application claims the benefit of earlier filing dates and right of priority to Korean Application No. 10-2022-0065482, filed on May 27, 2022 and Korean Application No. 10-2022-0066640, filed on May 31, 2022, the contents of which are hereby incorporated by reference herein in their entirety.

BACKGROUND OF THE DISCLOSURE

Field of the Disclosure

The present embodiments relate to a brake device applicable to vehicles in all fields and vehicle having the same, and more specifically, a brake device related to the forward and backward structures of a brake pad using a motor and vehicle equipped with the same.

Discussion of the Related Art

A brake device mounted on a vehicle is a device for decelerating, stopping, or maintaining a stationary state of a vehicle while driving, and is a device for obtaining a braking force by strongly pressing a disk, which rotates together with a vehicle wheel, with a brake pad on both sides of the disk.

A brake device of the related art includes a hydraulic cylinder for advancing and retreating a brake pad, and the brake pad is moved by hydraulic pressure. At the same time, the brake pad may be operated by a motor. A rotational motion of the motor may be converted into a linear motion of the brake pad by a ball screw structure. The brake devices of the related art may advance and retreat the brake pad by varying the source of braking power, such as using hydraulic pressure for main braking and using a motor for parking braking.

The background technology for embodiments disclosed in the present specification is disclosed in Korean Patent Publication No. 10-2019-0069884 (Publication on Jun. 20, 2019; Title of Invention: Caliper Device) and Korean Patent Publication No. 10-2014-0012451 (Publication on Feb. 3, 2014; Title of Invention: Caliper Brake).

A brake device of the related art has one piston connected to each brake pad and one ball screw structure per piston. As a result, a surface pressure of the brake pad may not be uniform, and if each piston has a ball screw structure, it causes an increase in the cost and overall weight of the brake device. These problems eventually correspond to factors that degrade the performance of the brake device.

In addition, the brake device of the related art includes a hydraulic cylinder for advancing and retreating the brake pad, and includes a structure in which the brake pad presses the brake disk by hydraulic pressure. However, the hydraulic cylinder requires a sealed structure to prevent leakage of hydraulic pressure, thereby causing a problem that a caliper body structure of the brake device is complicated. The complicated structure of the device causes a cost increase in the manufacturing process and negatively affects the appearance of the device.

In addition, since cylinder pressure works in the hydraulic cylinder, a cylinder part of the caliper body requires strong durability. Therefore, the material of the cylinder part is limited to a metal series, thereby causing an increase in the cost and weight of the device. In addition, if the hydraulic cylinder expands a piston diameter to secure braking force, the size of the device (e.g., the size of the caliper body) may increase and it may be difficult to secure space for installation.

Besides, the brake device may further include a motor for parking braking in addition to the hydraulic cylinder, thereby deflecting the center of gravity of the device because the motor should be disposed in a manner of avoiding the location of the hydraulic cylinder.

SUMMARY OF THE DISCLOSURE

Accordingly, embodiments of the present disclosure are directed to a brake device and vehicle having the same that substantially obviate one or more problems due to limitations and disadvantages of the related art.

One object of the present disclosure is to provide a brake device with improved surface pressure of a brake pad and vehicle having the same.

Another object of the present disclosure is to provide a brake device that improves the surface pressure of the brake pad, simplifies the configuration of components, and reduces weight and cost, and a vehicle equipped with the same.

Another object of the present disclosure is to provide a brake device that improves problems caused by the use of a hydraulic cylinder, and a vehicle equipped with the same.

Specifically, another object of the present disclosure is to provide a brake device having reduced size and weight of a caliper body and a vehicle equipped with the same.

Another object of the present disclosure is to provide a brake device having an improved center of gravity and a vehicle equipped with the same.

Another object of the present disclosure is to provide a brake device that is easy to produce and a vehicle equipped with the same.

Further object of the present disclosure is to provide a battery module assembly having a multi-row structure with increased cooling effect, durability, and rigidity.

Technical tasks obtainable from the present disclosure are non-limited by the above-mentioned technical tasks. And, other unmentioned technical tasks can be clearly understood from the following description by those having ordinary skill in the technical field to which the present disclosure pertains.

Additional advantages, objects, and features of the disclosure will be set forth in the disclosure herein as well as the accompanying drawings. Such aspects may also be appreciated by those skilled in the art based on the disclosure herein.

To achieve these objects and other advantages, in one technical aspect of the present disclosure, provided is a brake device including a motor unit operated by an electrical signal, a gear unit having a plurality of gears connected to the motor unit, a cylinder unit having a piston connected to the gear unit to be propelled by operations of a plurality of the gears, a brake pad unit connected to the piston to be propelled by propulsion of the piston, and a caliper body having the cylinder unit seated thereon to guide the brake pad unit.

The cylinder unit may include a plurality of pistons and the brake pad unit may be connected to a plurality of the pistons to be propelled by propulsions of a plurality of the pistons.

The cylinder unit may further include a bold screw rotated by an operation of the motor unit and a multi-piston connecting part connected to the bolt screw to move along the bolt screw and connected to a plurality of the pistons.

The multi-piston connecting part may include a straight movement portion connected to the bolt screw based on a ball screw structure, a plurality of piston fixing portions fixing one of a plurality of the pistons, and a connection structure portion integrally connecting the straight movement portion and a plurality of the piston fixing portions.

The cylinder unit may further include a sensor unit. The sensor unit may be connected by being penetrated by the bolt screw, and one lateral side of the sensor unit may come in contact with the caliper body.

In another technical aspect of the present disclosure, provided is a brake device including a motor unit operating by an electrical signal, a cylinder unit having a plurality of pistons propelled by an operation of the motor unit, a brake pad unit connected to a plurality of the pistons to be propelled by propulsions of a plurality of the pistons, and a caliper body having the cylinder unit seated thereon to guide the brake pad unit, wherein the cylinder unit may include a conversion assembly converting a rotational motion of the motor unit into a linear motion, wherein the conversion assembly may be provided singly irrespective of the number of a plurality of the pistons, and wherein the cylinder unit may further include a multi-piston connecting part making a linear motion by the conversion assembly and connecting a plurality of the pistons integrally.

In another technical aspect of the present disclosure, provided is a vehicle including a brake device according to embodiments and a wheel braked by a brake pad unit of the brake device.

In another technical aspect of the present disclosure, provided is a brake device including a motor unit, a gear unit having a plurality of gears connected to the motor unit, a cylinder unit having a piston connected to the gear unit to be propelled by operations of a plurality of the gears, a brake pad unit connected to the piston to be propelled by propulsion of the piston, and a caliper body having the cylinder unit seated thereon, wherein the brake pad unit is not operated by pressure of fluid.

In another technical aspect of the present disclosure, provided is a brake device including a motor unit, a cylinder unit having a plurality of pistons propelled by an operation of the motor unit, a brake pad unit connected to a plurality of the pistons to be propelled by a plurality of the pistons, and a caliper body having the cylinder unit seated thereon, wherein the cylinder unit may have a conversion assembly converting a rotational motion of the motor unit into linear motions of a plurality of the pistons, wherein the brake pad unit may not be propelled by pressure of fluid, and wherein the motor unit may be located in a left and right center of the caliper body.

In another technical aspect of the present disclosure, provided is a brake device including a conversion assembly converting a rotational motion of a motor unit into linear motions of a plurality of pistons, wherein the conversion assembly may include a bolt screw rotated by rotation of the motor unit and a ball screw nut making a linear motion in response to the bolt screw, wherein the co version assembly may further include a multi-piston connecting part connected to the ball screw nut and connecting a plurality of the pistons integrally, wherein the multi-piston connecting part may make a linear motion by an operation of the motor unit, wherein a plurality of the pistons may pressurize a disk assembly by propelling a brake pad, wherein the brake pad unit is not propelled by pressure of fluid, and wherein the motor unit is located in a left and right center of a caliper body.

In further technical aspect of the present disclosure, provided is a vehicle having a brake device including a pad carrier supporting a lateral side of a brake pad unit and connected to a caliper body, wherein the pad carrier is connected to a knuckle assembly of a vehicle wheel.

Accordingly, the present disclosure provides various effects and/or advantages.

According to one of embodiments of the present disclosure, there is an effect of improving a surface pressure of a brake pad according to the application of multiple pistons.

In addition, there is an effect of reducing the cost of a brake device by reducing a ball screw structure when applying multiple pistons.

According to one of embodiments of the present disclosure, the center of gravity of a brake device is improved, and the appearance is improved.

According to one of embodiments of the present disclosure, the volume and weight of a brake device are reduced, and the brake device is easily manufactured.

Effects obtainable from the present disclosure may be non-limited by the above-mentioned effect. And, other unmentioned effects can be clearly understood from the following description by those having ordinary skill in the technical field to which the present disclosure pertains. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. The above and other aspects, features, and advantages of the present disclosure will become more apparent upon consideration of the following description of preferred embodiments, taken in conjunction with the accompanying drawing figures. In the drawings.

DETAILED DESCRIPTION OF THE DISCLOSURE

Figure 1:
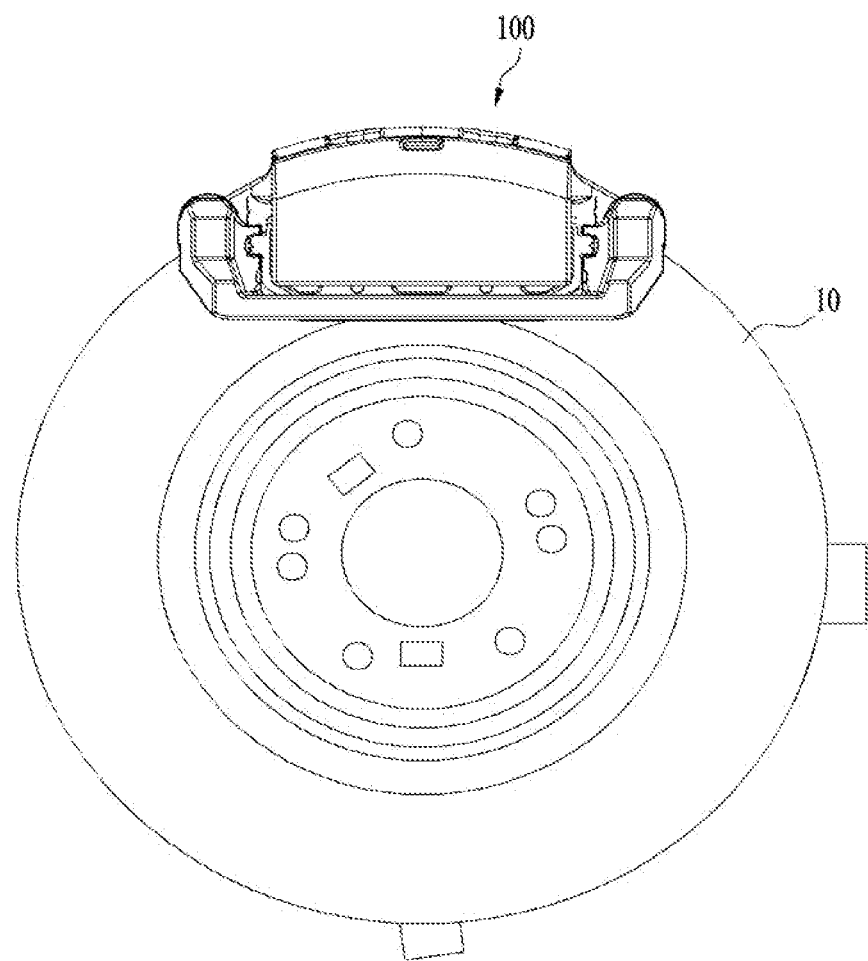
FIG. 1 is a front view diagram showing a brake device and a disk assembly according to one of embodiments of the present disclosure.

Advantages and features of the present disclosure, and a method for achieving them, will become clear with reference to the embodiments described below in detail together with the accompanying drawings. However, the present disclosure is not limited to the embodiments disclosed below, but may be implemented in various different forms. These embodiments are provided to complete the disclosure of the present disclosure, to fully inform those skilled in the art, to which the present disclosure pertains, and the present disclosure is only defined by the scope of claims.

Terms used in the present specification are for describing embodiments and are not intended to limit the present disclosure. In the present specification, a singular form also includes a plural form unless specifically stated in the phrase. As used in the specification, "comprises" and/or "comprising" do not preclude the presence or addition of one or more other components other than those mentioned. The same reference numerals throughout the specification refer to the same components, and "and/or" includes each and all combinations of one or more of the mentioned components. Although "first", "second", etc. are used to describe various components, these components are of course not limited by these terms. These terms are used only to distinguish one component from another component. Therefore, it is a matter of course that a first component mentioned below may be a second component within the technical idea of the present invention.

Without other definitions, all terms (including technical and scientific terms) used in the present specification may be used in a meaning that may be commonly understood by those skilled in the art to which the present invention pertains. In addition, terms defined in commonly used dictionaries are not ideally or excessively interpreted unless they are clearly specifically defined.

Spatially relative terms "below", "beneath", "lower", "above", "upper", etc. may be used to easily describe the correlation between one component and other components as illustrated in the drawings. Spatially relative terms should be understood as terms including different directions of components during use or operation in addition to the directions shown in the drawings. For example, if components shown in the drawing are reversed, the components described as "below" or "beneath" of the other components may be placed on the "above" of the other components. Thus, the exemplary term "below" may include both the lower and the upper directions. The components may be oriented in other directions, and thus spatially relative terms may be interpreted according to orientation.

Figure 2:
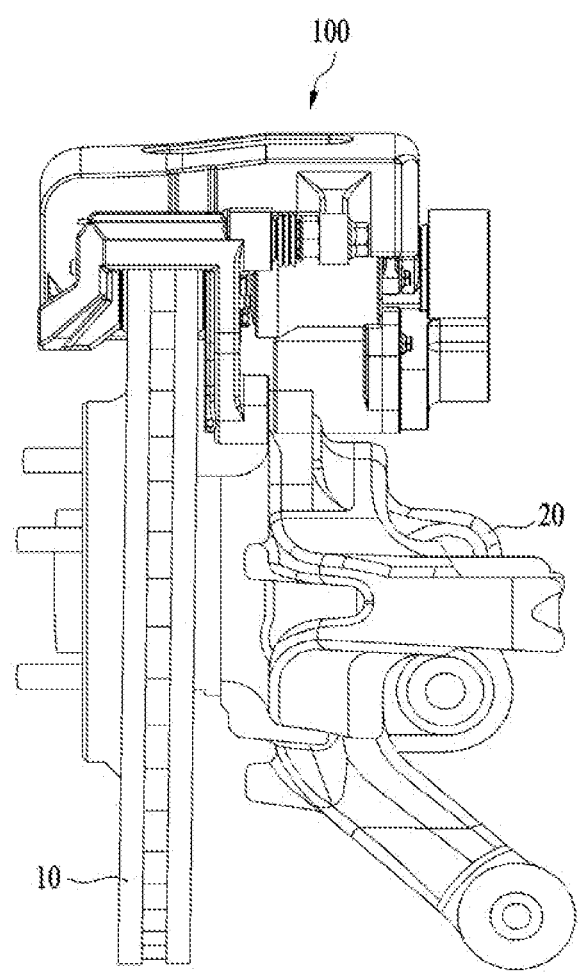
FIG. 2 is a side view diagram showing a brake device and a disk assembly according to one of embodiments of the present disclosure.

FIG. 1 is a front view diagram showing a brake device 100 (hereinafter 'brake device') and a disk assembly 10 according to one of embodiments of the present disclosure. FIG. 2 is a side view diagram showing the brake device 100 and the disk assembly 10. Hereinafter, in describing the brake device 100, criteria for the upper, lower, left, and right directions and the front and rear sides are based on the brake device 100 shown in FIG. 1.

Referring to FIGS. 1 and 2, a brake device 100 may apply braking to a wheel of a vehicle by pressing a surface of a disk assembly 10. The disk assembly 10 and a knuckle assembly 20 are configured to be connected to the wheel of the vehicle. During driving of the vehicle, the disk assembly 10 rotates together with the rotation of the wheel. When the brake device 100 applies pressure to the disk assembly 10, the rotation of the disk assembly 10 generates a resistance to reduce the rotation speed of the wheel. That is, the vehicle may be braked.

Figure 3:
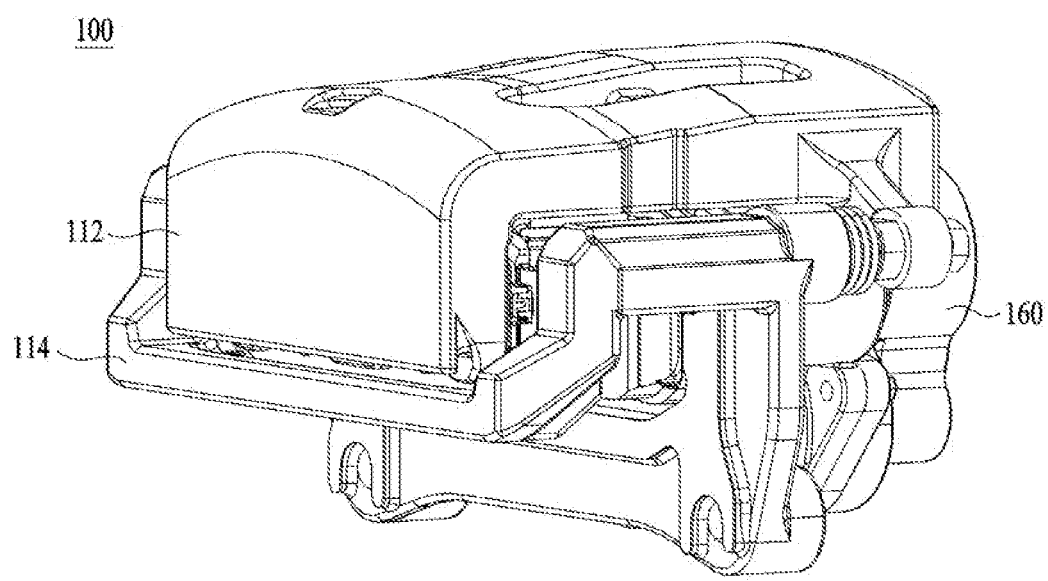
FIG. 3 is a perspective diagram showing a brake device according to one of embodiments of the present disclosure.

FIG. 3 is a perspective diagram showing the brake device 100. As shown in FIG. 3, the brake device 100 may include a caliper body 112 and a pad carrier 114. The caliper body 112 may provide a space in which components (e.g., cylinder unit, etc.) of the brake device 100 may be fixed or seated, and may guide the movement of a brake pad unit 120 for pressing the disk assembly 10. The caliper body 112 may be configured with a combination of a plurality of parts.

The pad carrier 114 may guide the movement of the brake pad unit 120 on both lateral sides (e.g., left and right sides) of the brake pad unit 120 or may support the brake pad unit 120. In addition, the pad carrier 114 may provide a position of a pad liner (not shown) for supporting the foot load of the brake pad unit 120. The pad carrier 114 may be connected to the caliper body 112 by suitable fixing parts (e.g., fixing pins). In addition, a bottom end portion of the pad carrier 114 is connected to the knuckle assembly 20 coupled to the wheel of the vehicle to connect the brake device 100 to the knuckle assembly 20.

Materials and shapes of the caliper body 112 and the pad carrier 114 may be variously determined in consideration of positions and loads of other components. Preferably, the material of the caliper body 112 and the pad carrier 114 includes a metal-based material. The caliper body 112 and the pad carrier 114 may be made of a metal-based material with appropriate strength to support the reaction force due to braking or to support the braking torque acting on the brake pad unit 120. The shape of the caliper body 112 has an open shape in which both sides of the brake pad 120 are exposed, and the pad carrier 114 has a shape connected to the exposed side of the brake pad unit 120 to support the brake pad unit 120 or guide a movement direction of the brake pad unit 120.

Figure 4:
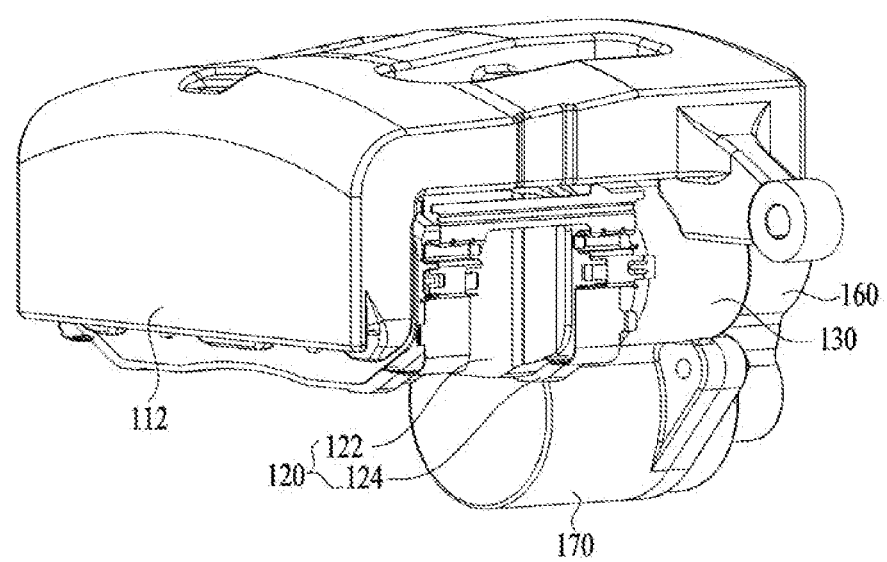
FIG. 4 is a perspective diagram of one portion of a brake device according to one of embodiments of the present disclosure.

FIG. 4 is a perspective diagram showing the brake device 100 of FIG. 3 except the pad carrier 114. Some of the drawings disclosed in the present specification may illustrate the brake device 100 except some components thereof to describe the structure of the brake device 100.

Referring to FIG. 4, the brake device 100 may include a brake pad unit 120 for pressing the disk assembly 10, a cylinder unit 130 including components for propelling the brake pad unit 120, a gear unit 160 including gears for propelling the brake pad unit 120, and/or a motor unit 170 for supplying power to propel the brake pad unit 120. The brake device 100 does not include a hydraulic cylinder. The brake device 100 may use only the power transmitted from the motor unit 170 for the operation of the brake pad unit 120.

The brake pad unit 120 may include a brake pad 122 that is in direct contact with the disk assembly 10 generate friction and a back plate 124 connected to one surface of the brake pad 122. A plurality of brake pad units 120 may be provided. One of the brake pad units 120 may pressurize one side of the disk assembly 10 and the other brake pad unit 120 may pressurize the other side of the disk assembly 10. Accordingly, a pair of the brake pad units 120 may be disposed in a manner of facing each other with the disk assembly 10 interposed therebetween.

An operation of the motor unit 170 may be controlled based on an electrical signal. When the motor unit 170 operates a motor, a rotational motion of the motor is transmitted to the cylinder unit 130 through the gear unit 160. The motor unit 170 may be disposed in the center region (e.g., left and right center regions) of the brake device 100. That is, the motor unit 170 may be disposed in the left and right center of the caliper body 112 or the pad carrier 114.

The gear unit 160 may be configured as an assembly of a plurality of gears for transmitting the rotational motion of the motor unit 170. A plurality of the gears are connected to the motor unit 170, and the number, positions, and sizes of a plurality of the gears may include various structures designed by those skilled in the art. A plurality of the gears may be composed of a combination of various gear structures such as a spur gear, a helical gear, a worm gear, and the like. The gear unit 160 may be formed of a plastic-based material to reduce cost and weight.

The cylinder unit 130 includes components for forwarding or retreating the brake pad unit 120 by receiving power from the gear unit 160. That is, the cylinder unit 130 may include a conversion assembly capable of converting a rotational motion transmitted from the gear unit 160 into a linear motion. In addition, the components of the cylinder unit 130 are configured to be separated from the caliper body 112. Since the brake device 100 does not use a hydraulic cylinder (i.e., non-hydraulically operated), the caliper body 112 does not need to consider the sealability of the piston and fluid moving by hydraulic pressure. Accordingly, the shape of the caliper body 112 may be small and simplified, and the cylinder unit 130 may be configured to be physically or functionally separated from the caliper body 112. The cylinder unit 130 may include a plastic-based material. A casing of the cylinder unit 130, a piston 132 located inside the casing, and/or a multi-piston connecting part 134 include a plastic-based material, thereby reducing the cost and weight of the device.

Figure 5:
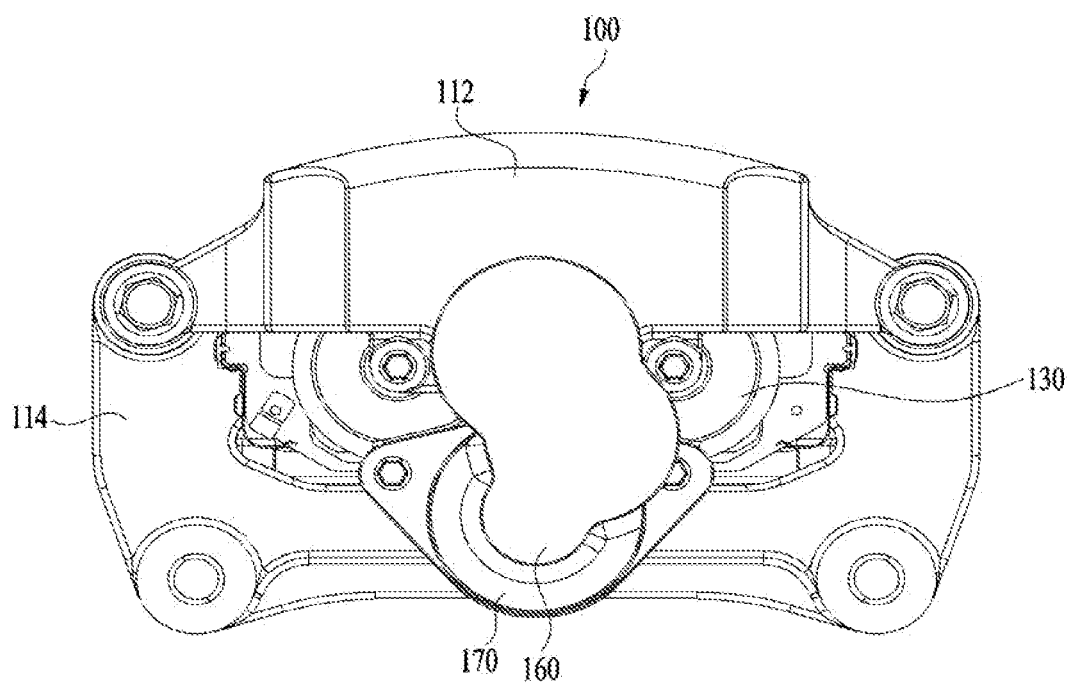
FIG. 5 is a rear view diagram showing a brake device according to one of embodiments of the present disclosure.

FIG. 5 is a rear view diagram showing the brake device 100. The cylinder unit 130 and the motor unit 170 may be located in the left and right center of the brake device 100, so that the center of gravity of the device is located in the left and right center. The left and right center refers to a central portion in the left and right directions of the brake device 100. In addition, in the brake device 100, the cylinder unit 130 may be positioned under the caliper body 112, and the motor unit 170 may be positioned under the cylinder unit 130. In the brake device 100, the motor unit 170 is located in the left and right center of the device, and the motor unit 170 is located under the cylinder unit 130, so that the center of gravity of the brake device 100 may be stably secured.

Figure 6:
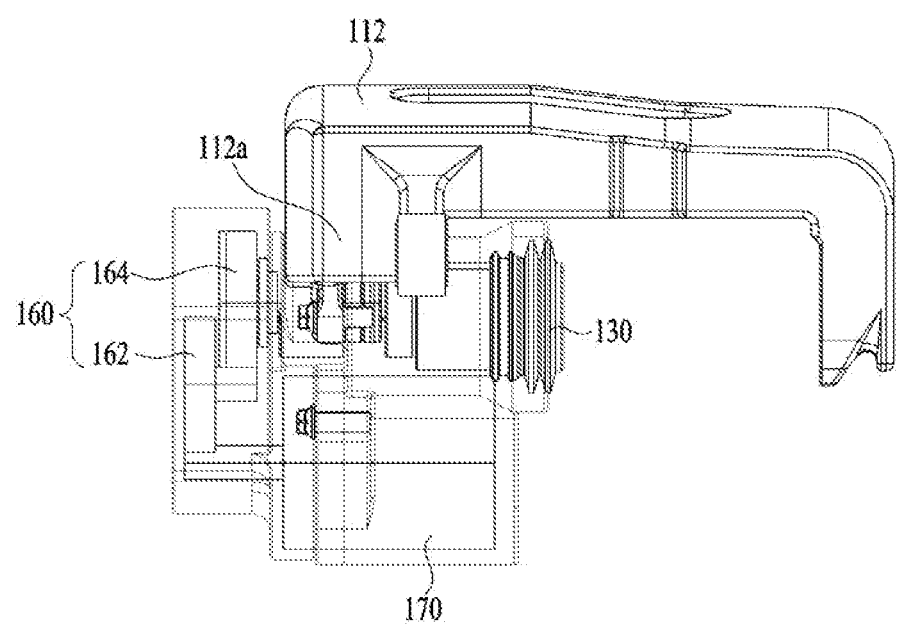
FIG. 6 is a cross-sectional diagram of a brake device according to one of embodiments of the present disclosure.

FIG. 6 shows a left and right central cross section of the brake device 100. Components unnecessary for the description including the brake pad unit 120 and the like have been omitted. In FIG. 6, the motor unit 170, the gear unit 160, and the cylinder unit 130 are represented so that interiors thereof are visible.

Referring to FIG. 6, when the motor unit 170 is operated, the gears (e.g., first gear and second gear) of the gear unit 160 are engaged with the motor gear to rotate. The first gear 162 is directly connected to the motor and rotates, and the second gear 164 is connected to the first gear 162 and rotates. A rotation shaft of the second gear 164 is connected to the cylinder unit 130, whereby a rotation motion is transmitted to the cylinder unit 130 by the rotation of the second gear 164. A shape of the caliper body 112 includes a reaction force support structure 112*a* between the gear unit 160 and the cylinder unit 130, so that the caliper body 112 can support the force generated during braking.

Figure 7:
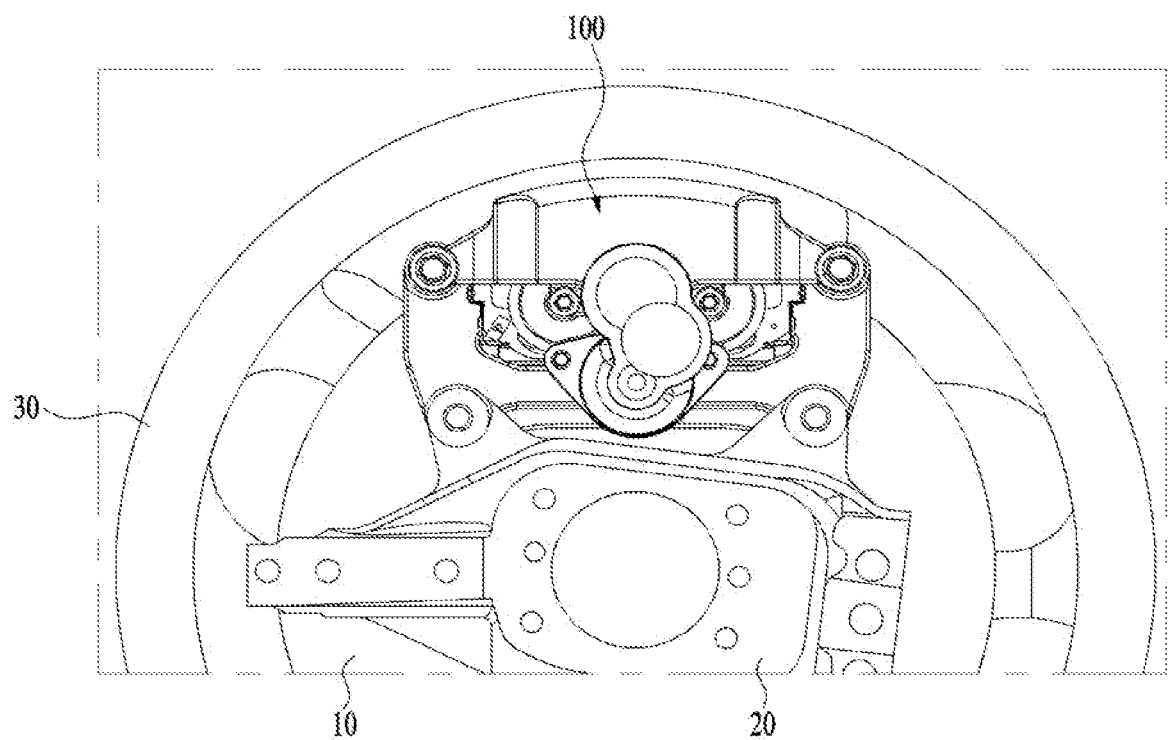
FIG. 7 is a diagram showing that a brake device according to one of embodiments of the present disclosure is mounted on a wheel of a vehicle.

FIG. 7 illustrates a state in which the brake device 100 is mounted on the wheel 30 of the vehicle. The pad carrier 114 of the brake device 100 is connected to the knuckle assembly 20, and the motor unit 170, the gear unit 160, and the cylinder unit 130 are disposed in the left and right center of the brake device 100 to secure a stable center of gravity.

Figure 8:
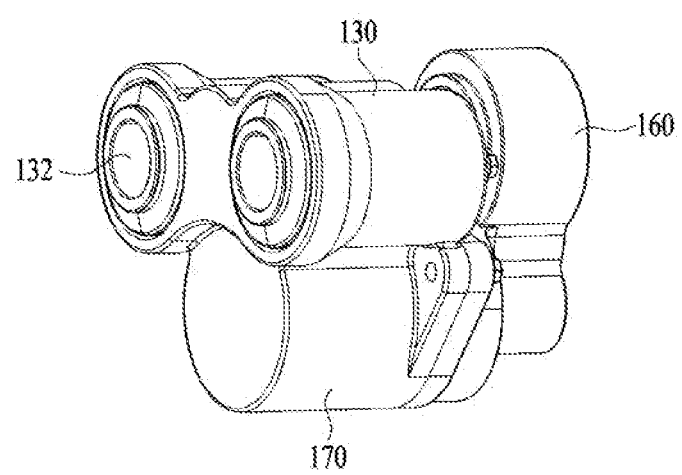
FIG. 8 is a diagram showing a motor unit, a gear unit, and a cylinder unit of a brake device according to one of embodiments of the present disclosure.
Figure 9:
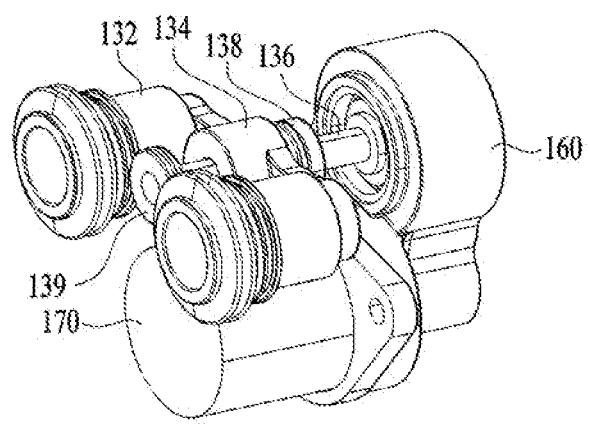
FIG. 9 is a diagram showing an inside of a cylinder unit of a brake device according to one of embodiments of the present disclosure.

FIG. 8 is a diagram showing the cylinder unit 130, the motor unit 170, and the gear unit 160 of the brake device 100. FIG. 9 is a diagram showing internal components of the cylinder unit 130.

Referring to FIGS. 8 and 9, the cylinder unit 130 may include a plurality of pistons 132. A plurality of the pistons 132 are connected to the back plate 124 of the brake pad unit 120, and linear motion of the piston 132 may propel the brake pad unit 120. The piston 132 is configured to transmit a force by being located between the brake pad unit 120 and the multi-piston connecting part 134, regardless of the shape of a regular piston, and may be referred to in other terms.

The cylinder unit 130 may include a plurality of the pistons 132, a multi-piston connecting part 134, a bolt screw 136 rotating by receiving power from the gear unit 160, a bearing 139, and/or a sensor unit 138.

The bolt screw 136 rotates through the gear rotation of the gear part 160 according to the operation of the motor unit 170, and the axial direction of the bolt screw 136 is parallel to the forward/backward (advancing or retreating) direction of the brake pad unit 120. Although not shown in the drawings, the bolt screw 136 may include a spiral screw on an outer surface thereof, and a nut structure corresponding thereto may linearly move in the axial direction of the bolt screw 136 when the bolt screw 136 is rotated. The bolt screw 136 and the nut structure corresponding thereto correspond to a conversion assembly that converts a rotational motion into a linear motion.

The ball screw structure includes a bolt screw 136 and a nut (or may be referred to as a ball screw nut) structure, and shows a structure in which the nut structure may linearly move by rotation of the bolt screw 136.

The conversion assembly for converting a rotation of a gear into a linear motion may be implemented by a combination of a rack gear and a pinion gear. In the brake device according to embodiments, the components of the conversion assembly may further include various structures that may be devised by those skilled in the art in addition to the ball screw structure. The brake pad unit 120 may move in a linear direction by the conversion assembly.

The conversion assembly may be provided as a single assembly irrespective of the number of a plurality of pistons. Since a plurality of the pistons may be integrally moved by the multi-piston connecting part 134 described below, a separate conversion assembly structure is not required for each piston. Owing to these properties, the brake device 100 may reduce cost and weight while applying a plurality of pistons.

The cylinder unit 130 may further include a bearing 139 connected to the bolt screw 136. One or more bearings 139 may be provided, and may be located at any specific point in the forward direction and the backward direction of the multi-piston connecting part 134. The bearing 139 may include a screw bearing, and maintain the position of the bolt screw 136 uniformly.

The sensor unit 138 includes a pressure sensor capable of measuring a pressure magnitude. The sensor unit 138 is connected in a manner of being penetrated by the bolt screw 236, and one side surface contacts the reaction force support structure 112a of the caliper body 112. The sensor unit 138 is positioned between the gear unit 160 and the multi-piston connecting part 134, and may measure the magnitude of the reaction force applied when the disk assembly 10 is pressurized. The caliper body 112 may have the reaction force support structure 112a of which portion is positioned between the cylinder unit 130 and the gear unit 26) to support the reaction force.

Figure 10:
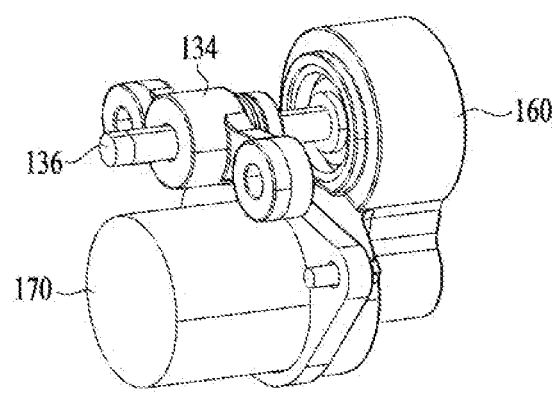
FIG. 10 is a diagram showing a portion of an inner configuration of a cylinder unit of a brake device according to one of embodiments of the present disclosure.

FIG. 10 illustrates the inside of the cylinder unit 130 except for a partial configuration in FIG. 9. The multi-piston connecting part 134 is connected to the bolt screw 136. The multi-piston connecting part 134 has a nut structure corresponding to the bolt screw 136 and may move linearly by rotation of the bolt screw 136.

Figure 11:
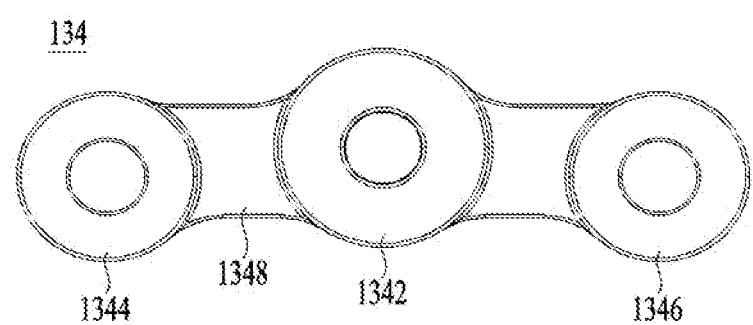
FIG. 11 is a diagram showing a multi-piston connecting part of a brake device according to one of embodiments of the present disclosure.
Figure 12:
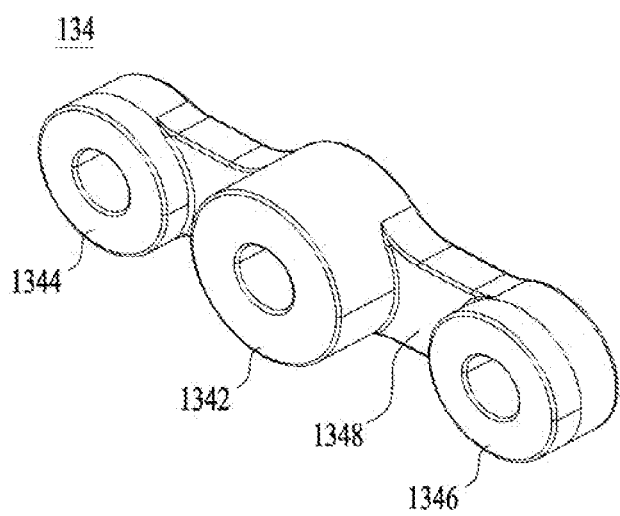
FIG. 12 is a perspective diagram showing a multi-piston connecting part of a brake device according to one of embodiments of the present disclosure.

FIG. 11 and FIG. 12 are diagrams showing the multi-piston connecting part 134 according to embodiments of the present disclosure. The multi-piston connecting part 134 includes a straight movement portion 1342 connected to the bolt screw 136, a connection structure portion 1348, and piston fixing portions 1344 and 1346 connected to the pistons 132. When plurality of the pistons 132 are provided, a plurality of the piston fixing portions 1344 and 1346 may be provided. For example, a plurality of the piston fixing portions may include a first piston fixing portion 1344 and a second piston fixing portion 1346.

The straight movement portion 1342 is configured to be connected to the bolt screw 136, and includes a ball screw nut structure. The bolt screw 136 and the ball screw nut structure are the structures in which a ball screw nut can move forward or backward along the axial direction of the bolt screw 136 by rotation of the bolt screw 136. The ball screw nut structure may include a ball bearing and a nut having a screw corresponding to the bolt screw 136. Since the straight movement portion 1342 has the ball screw nut structure corresponding to the bolt screw 136, it may be advanced or retreated in response to the rotation of the bolt screw 136.

The connection structure portion 1348 is configured to integrally connect the straight movement portion 1342 and a plurality of the piston fixing portions 1344 and 1346 together. Accordingly, when the straight movement portion 1342 moves, a plurality of the piston fixing portions 1344 and 1346 and a plurality of the pistons 132 may move simultaneously. The material of the connection structure portion 1348 may include a metal material having sufficient rigidity in consideration of the braking pressure. The structure of the connection structure portion 1348 for interconnecting (i.e., integrally connecting) the straight movement portion 1342 and a plurality of the piston fixing portions 1344 and 1346 may include various structures that may be devised by those skilled in the art.

The piston fixing portion 1344/1346 is configured to fix the piston 132 and is included in the multi-piston connecting part 134. The shape of the piston fixing portion may include a suitable shape for fixing the piston 132, and is not limited to the shape illustrated in the drawings. The piston 132 is connected between the brake pad unit 120 and the multi-piston connecting part 134, and the shape of the piston 132 may include various shapes as well as a conventional cylindrical piston shape, and may be referred to as various expressions.

Meanwhile, positions of a plurality of the piston fixing portions 1344 and 1346 may be symmetrical with respect to the straight movement portion 1342. Referring to FIG. 11 and FIG. 12, the first piston fixing portion, the straight movement portion 1342 and the second piston fixing portion 1346 may be arranged in a line.

Figure 13:
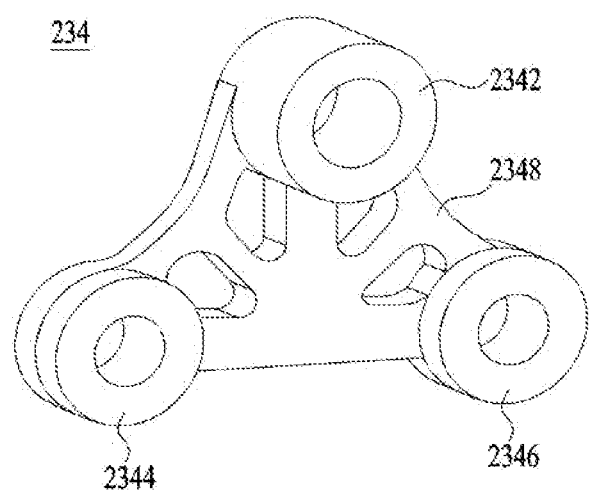
FIG. 13 is a perspective diagram showing a multi-piston connecting part of a brake device according to one of embodiments of the present disclosure.

FIG. 13 is a perspective diagram showing a multi-piston connecting part 234 according to another embodiment of the present disclosure. Referring to FIG. 13, a first piston fixing portion 2344, a straight movement portion 2342, and a second piston fixing portion 2346 are arranged at the positions of the vertexes of a virtual triangular shape, respectively. the straight movement portion 2342 may be disposed at a position of a top vertex of the triangular shape, and the first piston fixing portion 2344 and the second piston fixing portion 2346 may be disposed at positions of two vertices located at the bottom side of the triangular shape, respectively. The virtual triangular shape may include various triangles such as an equilateral triangle, a right triangle, an isosceles triangle, etc.

There may be two or more piston fixing portions t depending on the number of pistons. For example, there may be three or four piston fixing portions. If there are three piston fixing portions, the piston fixing portions may be arranged at vertex positions of a virtual triangular shape, respectively. In this case, the virtual triangle may include various shapes such as an equilateral triangle, a right triangle, an isosceles triangle, etc.

If there are four piston fixing portions, the piston fixing portions may be arranged at vertex positions of a virtual square shape. In this case, the virtual square may include various shapes such as a square, a rectangle, a trapezoid, a diamond shape, etc.

Positions of a plurality of the piston fixing portions may be symmetrically disposed with respect to the position of the straight movement portion 1342. A plurality of the piston fixing portions may apply force evenly to the brake pad unit 120. While a plurality of pistons pressurize the brake pad unit 120, the surface pressure of the brake pad unit 120 may be improved.

Figure 14:
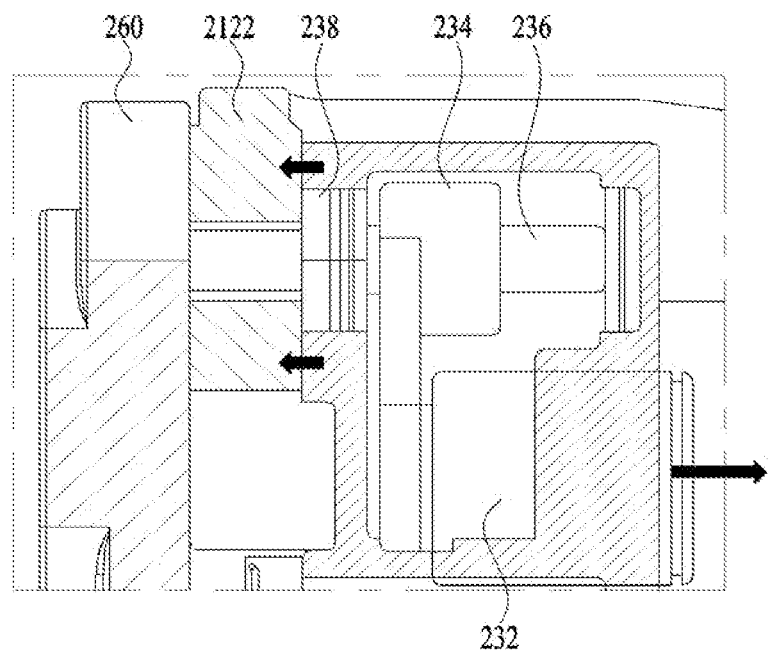
FIG. 14 is diagram showing an operation of a multi-piston connecting part of a brake device according to one of embodiments of the present disclosure.

FIG. 14 illustrates an operation principle of the sensor unit 238 according to the operation of the multi-piston connecting part 234. FIG. 14 illustrates an inner cross section of the brake device. Referring to FIG. 14, the multi-piston connecting part 234 moves in a direction of an arrow to pressurize the disk assembly. When the brake pad unit presses the disk assembly by the multi-piston connecting part 234, the corresponding reaction force acts on the reaction support structure 2122. The sensor unit 238 includes a pressure sensor capable of measuring a magnitude of an applied pressure. The sensor unit 238 is connected by being penetrated by the bolt screw 236, and one side surface contacts the caliper body. The sensor unit 238 may be positioned between the gear unit 260 and the multi-piston connecting part 234 to measure the magnitude of the reaction force described above. The caliper body may have a reaction force support structure 2122 of which shape is partially positioned between the cylinder unit 230 and the gear unit 260 to support the reaction force generated when the configuration of the cylinder unit 230 pressurizes the disk assembly.

Regarding the brake device 100 according to embodiments, the weight and cost of the device may be reduced by simplifying the configuration of pressing the brake pad. In addition, the surface pressure of the brake pad unit 120 may be improved by applying multiple pistons. In addition, it is possible to optimize the center of gravity of the entire device by varying the shape of the multi-piston connecting part. Therefore, it is possible to change the position of the reaction force support part of the device and to optimize the load path.

In addition, regarding the brake device 100 according to embodiments, the movement of the brake pad unit 120 is not operated by hydraulic pressure. That is, the movement of the brake pad unit 120 uses power of the motor unit 170 and performs main braking of the vehicle using the power. Accordingly, the brake device 100 may improve the disadvantages of the related art device due to the conventional hydraulic pressure characteristics.

Since the caliper body 112 of the brake device 100 does not require sealing performance of fluid, the structure is simple and manufactured easily. The cylinder unit 130 separable from the caliper body 112 does not operate by hydraulic pressure. Therefore, the durability condition of the cylinder unit may be alleviated and the cylinder unit may be configured to include a plastic-based material. For example, all or part of the configuration of the cylinder unit 130 may be made of a plastic-based material. Accordingly, the cost of manufacturing the brake device 100 may be lowered, and the weight of the device may be reduced.

In addition, since the brake device 100 according to the embodiments does not use a hydraulic cylinder, the motor unit 170, the gear unit 160, and the cylinder unit 130 may be intensively disposed in the left and right center of the brake device 100. Therefore, the center of gravity of the device is concentrated to the center, thereby increasing stability when the device is mounted on the vehicle wheel.

In the case of a hydraulic cylinder, the diameter of a piston must be secured to guarantee the braking force. Yet, since the brake device 100 uses motor power, the diameter of the piston may be further reduced and the volume of the device may be reduced. Accordingly, the brake device 100 has the advantage of being easily installed in a narrow space.

In addition, the brake device 100 may improve the surface pressure of the brake pad unit 120 by applying multiple pistons. A plurality of pistons may be applied by utilizing the advantage of reducing the size of the piston, and a plurality of the pistons uniformly improve the surface pressure of the brake pad unit 120.

The description of various embodiments of the present disclosure is not limited to the corresponding embodiment, and it is understood that the technical idea of each embodiment applied to various embodiments may be applied to other embodiments.

A detailed description of preferred embodiments of the present disclosure disclosed as described above is provided so that those skilled in the art can implement and embody the present disclosure. Although the description is made with reference to the preferred embodiments of the present disclosure, it will be appreciated by those skilled in the art that various modifications and variations can be made in the present disclosure without departing from the spirit or scope of the disclosures. For example, those skilled in the art may use the respective components described in the above-described embodiments in a manner of combining them with each other.

Therefore, the present disclosure is not intended to be limited to the embodiments shown herein, but to give the broadest scope that matches the principles and novel features disclosed herein.

As described above, related contents have been described in the best mode for carrying out the embodiments.

It will be apparent to those skilled in the art that various changes or modifications can be made to the embodiments within the scope of the embodiments. Thus, it is intended that the embodiments cover the modifications and variations of this disclosure provided they come within the scope of the appended claims and their equivalents.

What is claimed is:

1. A brake device comprising:
   a motor unit;
   a gear unit having a plurality of gears connected to the motor unit;
   a cylinder unit connected to the gear unit and comprising a plurality of pistons configured to be propelled by the plurality of gears;
   a brake pad unit connected to and propelled by the plurality of pistons; and
   a caliper body having the cylinder unit seated thereon,
   wherein the cylinder unit further comprising:
   a bolt screw configured to be rotated by the gear unit; and
   a multi-piston connecting part connected to move along the bolt screw and connected to the plurality of pistons.

2. The brake device of claim 1, wherein the brake pad unit is non-hydraulically operated.

3. The brake device of claim 2, wherein the motor unit is disposed in a center of the caliper body.

4. The brake device of claim 3, wherein:
   the cylinder unit further comprises a sensor unit,
   the sensor unit is connected by being penetrated by the bolt screw, and
   one lateral side of the sensor unit comes in contact with the caliper body.

5. The brake device of claim 4, wherein the sensor unit is configured to measure a reaction force generated from pressurizing a disk assembly by the brake pad unit propelled by the plurality of pistons.

6. The brake device of claim 5, the cylinder unit further comprising a bearing connected to the bolt screw.

7. The brake device of claim 1, the multi-piston connecting part comprising:
   a straight movement portion connected to the bolt screw;
   a plurality of piston fixing portions, each fixing respectively one of the plurality of pistons; and
   a connection structure portion interconnecting the straight movement portion and the plurality of piston fixing portions.

8. The brake device of claim 7, wherein:
   in the multi-piston connecting part, a plurality of piston fixing portions comprise a first piston fixing portion and a second piston fixing portion, and
   the straight movement portion, the first piston fixing portion and the second piston fixing portion are colinear.

9. The brake device of claim 7, wherein:
   in the multi-piston connecting part, the plurality of piston fixing portions comprise a first piston fixing portion and a second piston fixing portion, and the straight movement portion, the first piston fixing portion and the second piston fixing portion are disposed respectively at vertex positions of a virtual triangle.

10. A brake device, comprising:
a motor unit;
a cylinder unit having a plurality of pistons configured to be propelled by the motor unit;
a brake pad unit connected to and propelled by the plurality of pistons; and
a caliper body having the cylinder unit seated thereon, wherein:
   the cylinder unit has a conversion assembly configured to covert a rotational motion of the motor unit into linear motions of the plurality of pistons, the conversion assembly being a single unit irrespective of a number of the plurality of pistons,
   the brake pad unit is non-hydraulically operated, and
   the motor unit is located in a center region of the caliper body.

11. A brake device, comprising:
a motor unit operating by an electrical signal;
a cylinder unit having a plurality of pistons propelled by the motor unit;
a brake pad unit connected to and propelled by the plurality of pistons; and
a caliper body having the cylinder unit seated thereon and configured to guide the brake pad unit, wherein:
   the cylinder unit comprises a conversion assembly configured to convert a rotational motion of the motor unit into a linear motion,
   the conversion assembly is a single unit irrespective of a number of the plurality of pistons, and
   the cylinder unit further comprises a multi-piston connecting part moving linearly by the conversion assembly and integrally connected to the plurality of pistons.

* * * * *